United States Patent
Norris et al.

(10) Patent No.: US 11,741,640 B2
(45) Date of Patent: Aug. 29, 2023

(54) DYNAMIC GENERATION OF CUSTOM COLOR SELECTIONS

(71) Applicant: PPG Industries Ohio, Inc., Cleveland, OH (US)

(72) Inventors: Alison Norris, Gibsonia, PA (US); Kristi Kauffman, Pittsburgh, PA (US); Francis Groves, McMurray, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 116 days.

(21) Appl. No.: 17/018,618

(22) Filed: Sep. 11, 2020

(65) Prior Publication Data
US 2021/0082158 A1    Mar. 18, 2021

Related U.S. Application Data

(60) Provisional application No. 62/899,679, filed on Sep. 12, 2019.

(51) Int. Cl.
G06T 11/00    (2006.01)
G06T 1/20    (2006.01)

(52) U.S. Cl.
CPC .............. *G06T 11/001* (2013.01); *G06T 1/20* (2013.01)

(58) Field of Classification Search
CPC ................................ G06T 11/001; G06T 1/20
See application file for complete search history.

(56) References Cited

U.S. PATENT DOCUMENTS

| | | | |
|---|---|---|---|
| 4,199,877 A | 4/1980 | Akiyama | |
| 4,887,217 A | 12/1989 | Sherman et al. | |
| 4,966,461 A | 10/1990 | Hooper | |
| 5,254,978 A | 10/1993 | Beretta | |

(Continued)

FOREIGN PATENT DOCUMENTS

| | | |
|---|---|---|
| EP | 1852826 A1 | 7/2007 |
| FR | 2838373 A | 10/2003 |

(Continued)

OTHER PUBLICATIONS

Golden Ratio Relationships in Color—The Golden Ratio, Phi, 1.618, by Gary Meisner, dated May 9, 2012.

(Continued)

*Primary Examiner* — Sing-Wai Wu
*Assistant Examiner* — Khoa Vu
(74) *Attorney, Agent, or Firm* — Workman Nydegger

(57) ABSTRACT

A computer system for dynamic generation of custom color selections receives from a user an indication of a target color. The computer system also identifies a location of the target color within a mathematically-defined color space. The computer system identifies a location of a second color within the mathematically-defined color space. Additionally, the computer system generates a first golden triangle within the mathematically-defined color space. The location of the target color comprises a first vertex of the first golden triangle. The location of the second color comprises a second vertex of the first golden triangle. A location of a third color comprises a third vertex of the first golden triangle. The computer system then displays on a user interface an indication of the target color, the second color, and the third color.

18 Claims, 10 Drawing Sheets

(56) References Cited

U.S. PATENT DOCUMENTS

| | | | |
|---|---|---|---|
| 5,311,212 A | 5/1994 | Beretta | |
| 5,615,320 A | 3/1997 | Lavendel | |
| 6,081,253 A | 6/2000 | Luke et al. | |
| 7,116,420 B2 | 10/2006 | Skierski et al. | |
| 7,502,033 B1 * | 3/2009 | Axelrod | G09G 5/06 345/589 |
| 9,019,296 B1 | 4/2015 | Abraham | |
| 9,311,889 B1 | 4/2016 | Dorner et al. | |
| 10,223,427 B1 | 3/2019 | Blackburn et al. | |
| 2002/0130884 A1 | 9/2002 | Rose | |
| 2005/0099630 A1 | 5/2005 | Reynolds et al. | |
| 2005/0102349 A1 | 5/2005 | Rice et al. | |
| 2006/0022994 A1 | 2/2006 | Hussie | |
| 2006/0066629 A1 | 3/2006 | Norlander et al. | |
| 2006/0098025 A1 | 5/2006 | Jang et al. | |
| 2007/0213948 A1 | 9/2007 | Hornstein | |
| 2007/0257933 A1 | 11/2007 | Klassen et al. | |
| 2009/0009528 A1 * | 1/2009 | Olive | H04N 1/644 345/591 |
| 2009/0310153 A1 | 12/2009 | Ito et al. | |
| 2010/0194776 A1 * | 8/2010 | Chong | G01J 3/528 345/594 |
| 2011/0018895 A1 | 1/2011 | Buzyn et al. | |
| 2011/0018896 A1 | 1/2011 | Buzyn et al. | |
| 2011/0252344 A1 | 10/2011 | van Os | |
| 2012/0075329 A1 | 3/2012 | Skaff et al. | |
| 2013/0315477 A1 * | 11/2013 | Murray | G06F 16/58 382/159 |
| 2014/0267367 A1 * | 9/2014 | Chong | H04N 1/60 345/595 |
| 2015/0170380 A1 | 6/2015 | Duwenhorst | |
| 2015/0235389 A1 | 8/2015 | Miller et al. | |
| 2015/0248228 A1 | 9/2015 | Van De Sluis et al. | |
| 2015/0324365 A1 | 11/2015 | Becker et al. | |
| 2015/0379731 A1 | 12/2015 | Haitani et al. | |
| 2015/0379739 A1 | 12/2015 | Blackburn et al. | |
| 2015/0379743 A1 | 12/2015 | Dorner et al. | |
| 2016/0005188 A1 | 1/2016 | Dorner et al. | |
| 2016/0048943 A1 | 2/2016 | Isberg et al. | |
| 2016/0142625 A1 * | 5/2016 | Weksler | H04N 5/23206 348/222.1 |
| 2016/0171304 A1 | 6/2016 | Yan et al. | |
| 2016/0335784 A1 | 11/2016 | Dorner et al. | |
| 2018/0357231 A1 | 12/2018 | Kraft et al. | |
| 2019/0034976 A1 | 1/2019 | Hamedi et al. | |
| 2019/0080488 A1 | 3/2019 | Hill | |
| 2020/0111446 A1 | 4/2020 | Berlingerio et al. | |
| 2020/0379613 A1 * | 12/2020 | Dempsey | G06F 3/04842 |

FOREIGN PATENT DOCUMENTS

| | | |
|---|---|---|
| GB | 0254649 A | 7/1926 |
| GB | 2418029 A | 3/2006 |
| NL | 1033836 C1 | 1/2009 |
| WO | 2013/185915 A1 | 12/2013 |

OTHER PUBLICATIONS

How to Choose Colours Procedurally (Algorithms)—Dev.Mag, Jul. 29, 2012.
IEEE Transactions' Color Quantization and Processing, Nov. 2001.
PhiMatrix Golden Ratio Color Palette Generator.
Possibilities Choosing Colors using Phi (the Golden Ratio)?—Graphic Design Stack Exchange, Aug. 2011.

* cited by examiner

DYNAMIC GENERATION OF CUSTOM COLOR SELECTIONS

CROSS-REFERENCE TO RELATED APPLICATIONS

This application claims the benefit of and priority to U.S. Provisional Patent Application Ser. No. 62/899,679 filed on 12 Sep. 2019 and entitled "DYNAMIC GENERATION OF CUSTOM COLOR SELECTIONS," which application is expressly incorporated herein by reference in its entirety.

TECHNICAL FIELD

The present invention relates to computer-implemented methods and systems for utilizing technological improvements to aid in identifying desired coat colors.

BACKGROUND OF THE INVENTION

Modern coatings provide several important functions in industry and society. Coatings can protect a coated material from corrosion, such as rust. Coatings can also provide an aesthetic function by providing a particular color and/or spatial appearance to an object. For example, most automobiles are coated using paints and various other coatings in order to protect the metal body of the automobile from the elements and also to provide aesthetic visual effects.

In view of the wide-ranging uses for different coatings, it is often necessary for customers to identify a desired coating color. For instance, it might be necessary to identify one or more paints for a bedroom or one or more paints for a garden shed. Currently this identification process can be overwhelming due to the seemingly countless coatings variations that are available. In view of the enormous selection of available options, many consumers have a challenging time identifying color schemes that will together provide a pleasing aesthetic.

Similarly, the current methods of identifying coating colors provide several distinctly technical challenges. Many modern coating database have tens of thousands of possible coating colors available. It can be computationally intensive to individually analyze every available coating color with respect to every other color within the database. Further, it is technically challenging to provide interesting and useful combinations of colors that are appealing to consumers. One of skill in the art will appreciate that computer-based technology does not have an innate appreciation for aesthetic effect. Accordingly, there are several deficiencies within the art that can be benefited by technical advancements.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The present invention comprises a computer system for dynamic generation of custom color selections. The computer system comprises one or more processors and one or more computer-readable media having stored thereon executable instructions that when executed by the one or more processors configure the computer system to perform various acts for dynamic generation of custom color selections. The computer system receives from a user an indication of a target color. The computer system also identifies a location of the target color within a mathematically-defined color space. The computer system identifies a location of a second color within the mathematically-defined color space. Additionally, the computer system generates a first golden triangle within the mathematically-defined color space. The location of the target color comprises a first vertex of the first golden triangle. The location of the second color comprises a second vertex of the first golden triangle. A location of a third color comprises a third vertex of the first golden triangle. The computer system then displays on a user interface an indication of the target color, the second color, and the third color.

The present invention also comprises a method, executed on one or more processors, for dynamic generation of custom color selections. The method comprises receiving from a user an indication of a target color. Additionally, the method comprises identifying a location of the target color within a mathematically-defined color space. The method also comprises identifying a location of a second color within the mathematically-defined color space. In addition, the method comprises generating a first golden triangle within the mathematically-defined color space. The location of the target color comprises a first vertex of the first golden triangle. The location of the second color comprises a second vertex of the first golden triangle. A location of a third color comprises a third vertex of the first golden triangle. Further, the method comprises displaying on a user interface an indication of the target color, the second color, and the third color.

The present invention further comprises a computer-readable media comprising one or more physical computer-readable storage media having stored thereon computer-executable instructions that, when executed at a processor, cause a computer system to perform a method for dynamic generation of custom color selections. The method comprises receiving from a user an indication of a target color. Additionally, the method comprises identifying a location of the target color within a mathematically-defined color space. The method also comprises identifying a location of a second color within the mathematically-defined color space. In addition, the method comprises generating a first golden triangle within the mathematically-defined color space. The location of the target color comprises a first vertex of the first golden triangle. The location of the second color comprises a second vertex of the first golden triangle. A location of a third color comprises a third vertex of the first golden triangle. Further, the method comprises displaying on a user interface an indication of the target color, the second color, and the third color.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description, clauses and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE PREFERRED EMBODIMENTS

Figure 1:
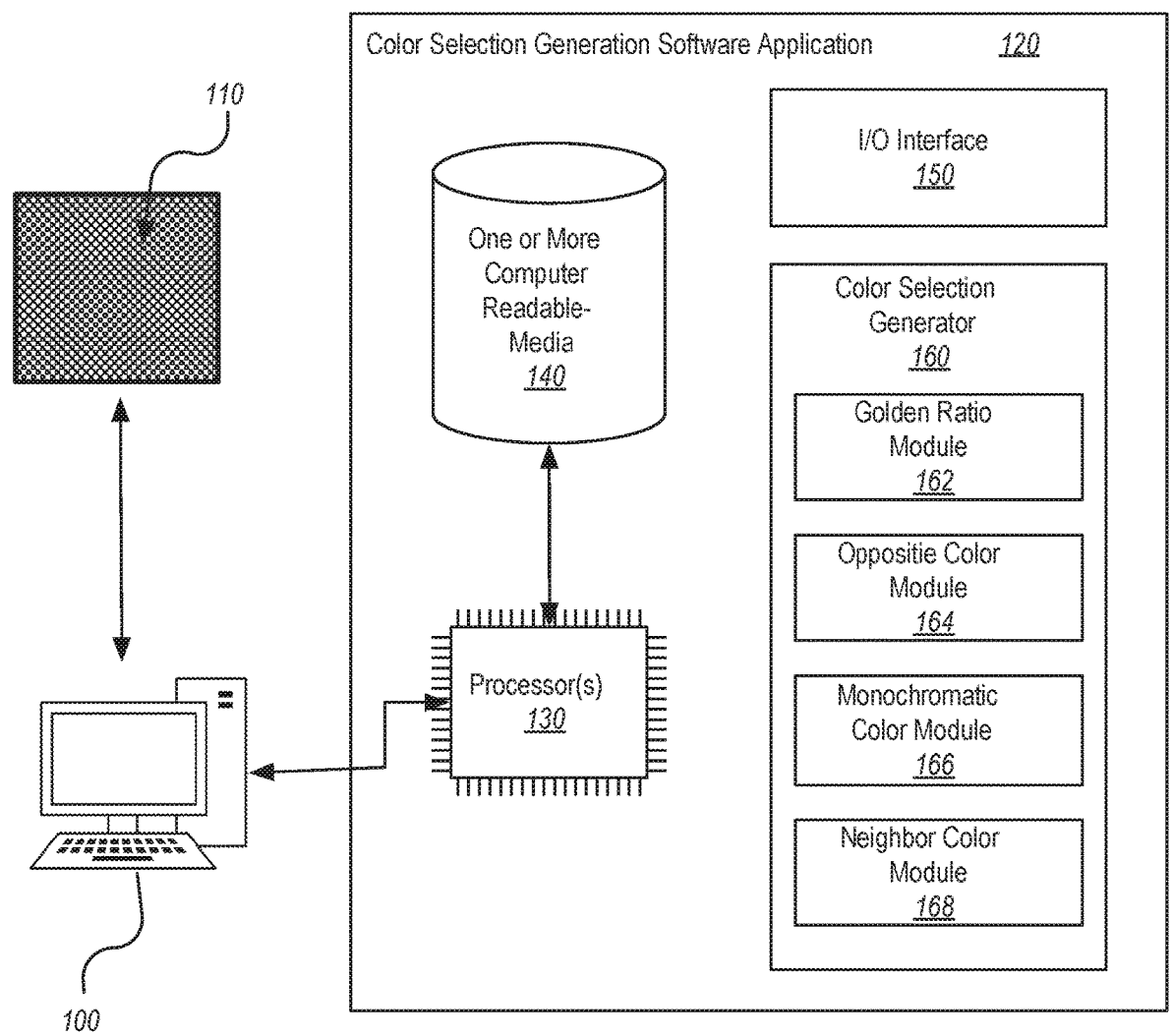
FIG. 1 depicts a schematic diagram of a computer system executing a color selection generation software application.

The present invention extends to computer systems, computer-implemented methods, computer-readable media with instructions, and devices for dynamic generation of custom color selections. For example, in accordance with the present disclosure a computer system may receive an indication of a target color from a user. The indication of the target color may be received in a variety of different forms. For example, the user may provide a picture or sample of an object that the user wishes to match with the target color. The picture or sample of the object may be measured using a spectrophotometer to identify a target color associated with the picture or sample of the object. Alternatively, the user may provide information that selects a particular color by entering a color name, color code, or selecting a displayed color. One will appreciate that there are a number of different ways that a user can provide an indication of a target color to the computer system. Unless stated otherwise, the present invention is not limited to a particular means for receiving the indication of the target color from the user.

Once the computer system receives the indication of the target color, the computer system may map the target color to a known color within a color database. For example, the indication of the target color may comprise a swatch of fabric from a chair. An exact color match to the swatch of fabric may not be available as a coating. Accordingly, the computer system identifies within the color database, a nearest matching color to the swatch of fabric that is associated with the indication of the target color. Accordingly, the computer system maps the target color to a known color, that is available, within the color database. As used herein a "nearest match" may be determined using a number of different conventional color matching methods. For instance, the nearest/closest match is a color within a color database with the smallest distance in the mathematically-defined color space to the location of the searched color. One will appreciate that in some cases an exact match to the indication of the target color may be available within the color database. In any case, as used herein, the "target color" comprises the known color from the color database, whereas, the "indication of the target color" may be associated with a slightly different particular color.

Once the target color has been identified, the computer system analyzes the colors within a mathematically-defined color space. The computer system proposes one or more accompanying colors that may be aesthetically pleasing when paired within the target color. The proposed one or more accompanying colors may be identified by calculating a golden ratio triangle within the mathematically-defined color space and proposing colors from the color database that are most closely associated with the vertices of the golden ratio triangle. For instance, the colors from the color database that are most closely associated with the vertices of the golden ratio triangle may comprise the colors within a color database that have the smallest distance in the mathematically-defined color space to the vertices of the golden ratio triangle. Various additional or alternative methods may be used to propose different or additional accompanying colors.

Turning now to the Figures, FIG. 1 depicts a schematic diagram of a system executing a color selection generation software application. The depicted system comprises a computer system 100 for dynamic generation of custom color selections. The computer system 100 comprises one or more processors 130 and one or more computer-readable media 140 that have stored thereon executable instructions that when executed by the one or more processors configure the computer system 100 to perform various acts. The one or more processors 130 and the one or more computer-readable media 140 may comprise local computer hardware and/or cloud-based computer hardware. The computer system 100 executes the color selection generation software application 120 using the one or more processor(s) 130 that execute computer executable instructions stored on the one or more computer-readable media 140.

The color selection generation software application 120 is also in communication with an I/O interface 150. The I/O interface 150 may be in communication with a keyboard, a mouse, a digital display, a network communication interface, Bluetooth radios, GPS radios, and various other conventional computer I/O interfaces. The computer system 100 is programmed to receive, through the I/O interface 150, an indication of a target color 110.

The color selection generation software application 120 also comprises a color selection generator 160. The color selection generator 160 comprises various modules for generating one or more proposed accompanying colors that may be aesthetically pleasing when paired within the target color 110. The modules include a golden ratio module 162, an opposite color module 164, a monochromatic color module 166, and a neighbor color module 168. As used herein, a "module" comprises computer executable code and/or computer hardware that performs a particular function. One of skill in the art will appreciate that the distinction between different modules is at least in part arbitrary and that modules may be otherwise combined and divided and still remain within the scope of the present disclosure. As such, the description of a component as being a "module" is provided only for the sake of clarity and explanation and should not be interpreted to indicate that any particular structure of computer executable code and/or computer hardware is required, unless expressly stated otherwise. In this description, the terms "component", "agent", "manager", "service", "engine", "virtual machine" or the like may also similarly be used.

Figure 2:
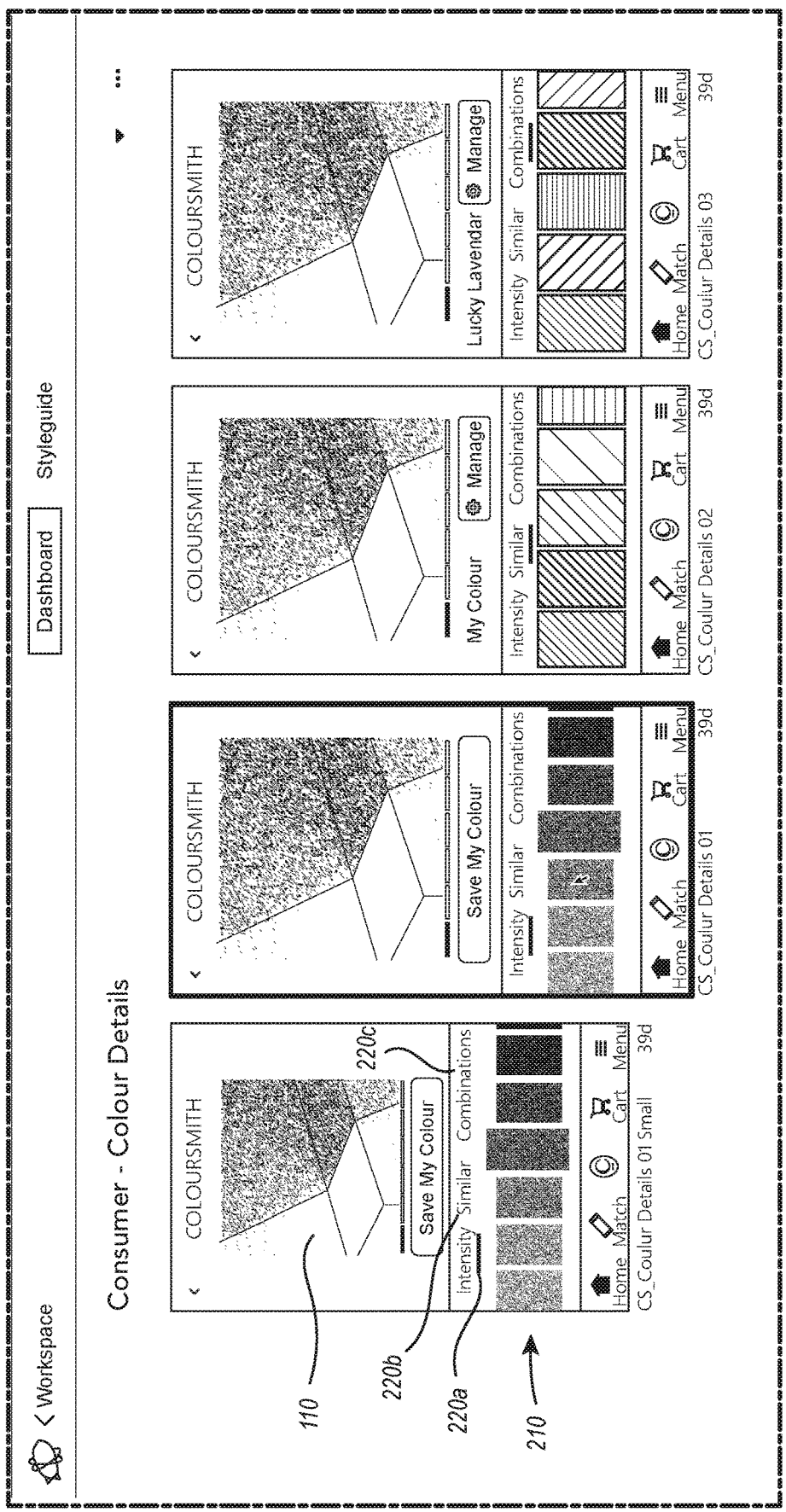
FIG. 2 depicts a user interface for a color selection generation software application.

FIG. 2 depicts a user interface 200 for a color selection generation software application 120. As the color selection generator 160 generates proposed accompanying colors, the user interface 200 displays the various colors. For example, the user interface 200 may display the target color 110 along with various different categories 220(a-c) of accompanying colors 210. In the depicted example, the different categories 220(a-c) include accompanying colors that fall within an intensity category 220a, a similar category 220b, and a combinations category 220c. One will appreciate, however, that the user interface 200 and these particular categories 220(a-c) are provided for the sake of example and explanation and do not limit the invention unless expressly stated otherwise.

Figure 3:
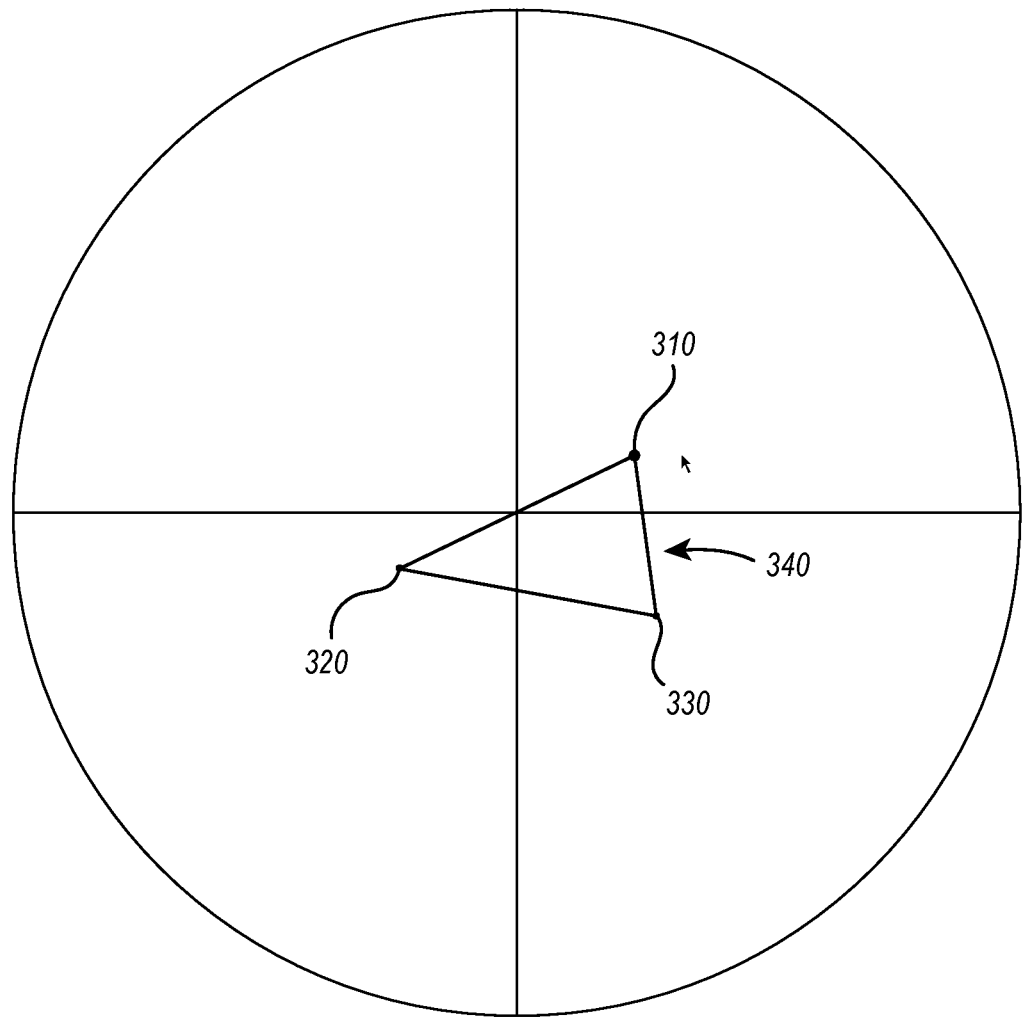
FIG. 3 depicts a location of a target color and locations of potential proposed colors within a mathematically-defined color space.

FIG. 3 depicts a target color 110 and a location of the target color 310 and potential proposed colors within a mathematically-defined color space 300. In the depicted example, the mathematically-defined color space 300 may comprise the CIELAB color space. The CIELAB color spaces expresses color as three values: L* for lightness and a* and b* for color. When plotted within a two-dimensional cartesian coordinate system, the x-axis and the y-axis are represented by a* and b* respectively. In practice, however, the CIELAB color space is three-dimensional with the z-axis being represented by L* (lightness). Hue is measured as an angle within the a*-b* plane. Chroma is a measurement of a ray extending from the axis of the a*-b* plane. Saturation is measured as an angle in the a*-L* plane. In each example presented herein, the CIELAB color space may be utilized, however, the present invention is not limited to the CIELAB color space and one of skill in the art would appreciate its application across many mathematically-defined color spaces.

After receiving from a user the indication of the target color 110, the color selection generation software application 120 communicates the target color 110 to the golden ratio module 162. The golden ratio module 162 identifies a location of the target color 310 within a mathematically-defined color space 300. The location of the target color 310 may comprise L*, a*, b* values within the CIELAB color space. The other color locations described herein may similar be calculated within the CIELAB color space.

The golden ratio module 162 then identifies a location of a second color 320 within the mathematically-defined color space 300. For example, the opposite color module 164 may identify the location of the second color 320 within the mathematically-defined color space 300 by calculating a set of second-color coordinates that are inverse to a set of coordinates associated with the location of the target color 310. For instance, the mathematically-defined color space 300 may be set upon a cartesian coordinate system, such as within the CIELAB color space. Within such a mathematically-defined color space 300, the location of the target color 310 may be designated as (+a*, +b*). By calculating the inverse of the set of coordinates associated with the target color, the opposite color module 164 may identify the location of the second color 320 as being at (−a*, −b*). One will appreciate that alternative means may be used for calculating an inverted position on a variety of different coordinate systems and still remain within the scope of the present invention. For instance, the generation of inverse colors in the RGB space is done by subtracting the RGB values from 255. For instance, the inverse of RGB [200, 200, 10] results in RGB [50, 50 245]. This can also be exemplified with an RGB color wheel.

Once the location of the second color 320 is calculated, the golden ratio module 162 generates a first golden triangle 340 within the mathematically-defined color space 300. As used herein, a "golden triangle" comprises an isosceles triangle having vertex angles of 36°, 72° and 72° or alternatively an isosceles triangle having vertex angles of 36°, 36° and 108°. As depicted in FIG. 3, the location of the target color 310 comprises a first vertex of the first golden triangle 340, the location of the second color 320 comprises a second vertex of the first golden triangle 340, and a location of a third color 330 comprises a third vertex of the first golden triangle 350.

Once the location of the second color 320 and the location of the third color 330 are identified, the color selection generator 160 identifies respective colors within a color database that are closest to the location of the second color 320 and the location of the third color 330. The color database may be stored within the one or more computer-readable media 140. The color selection generator 160 may utilize a distance calculation to identify a second color within the color database that is closest to the location of the second color 320 and to identify a third color within the color database that is closest to the location of the third color 330. The computer system 100 then displays on a user interface 200 an indication of the target color 110, the second color, and the third color.

Figure 4:
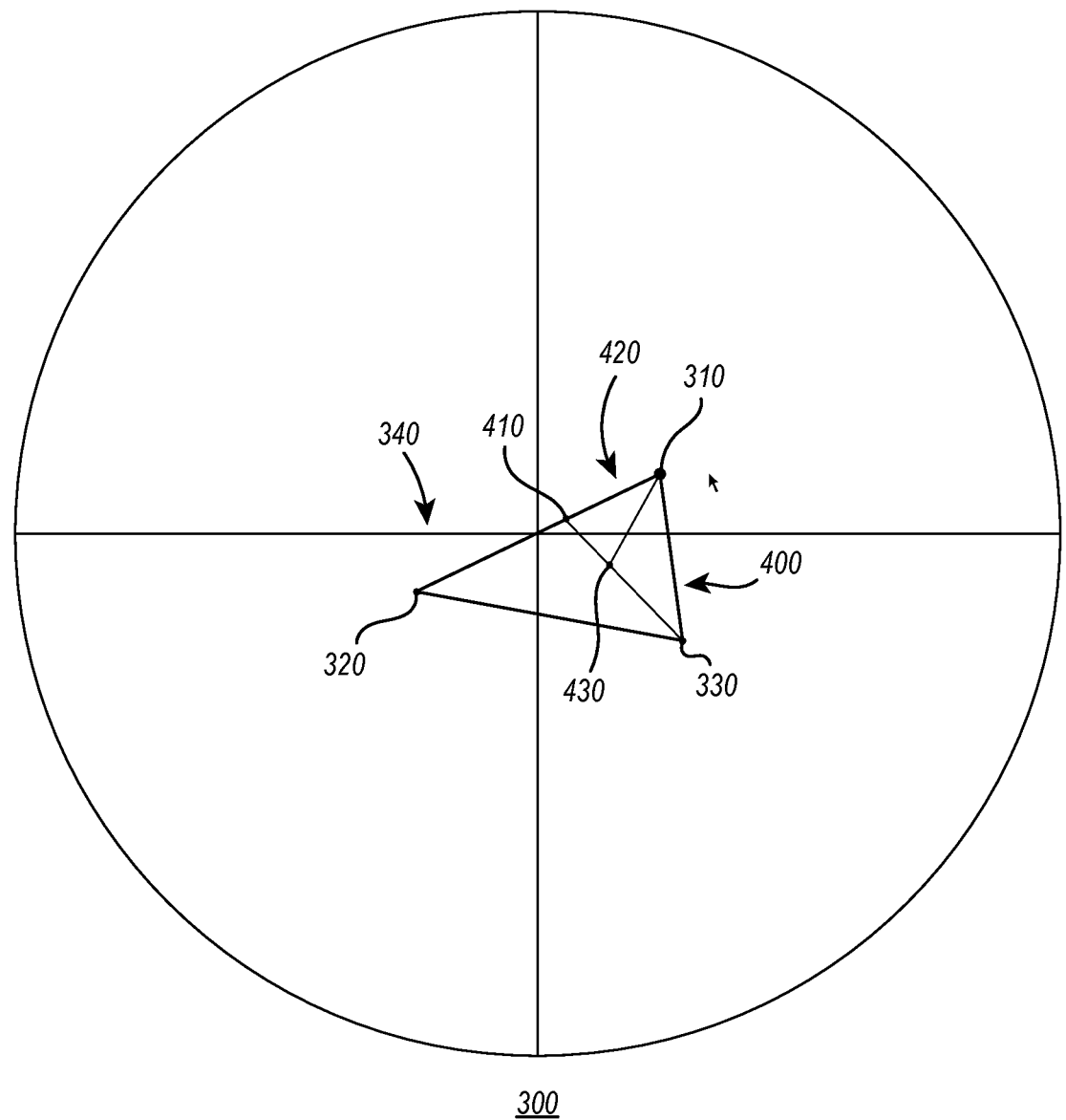
FIG. 4 depicts a location of a target color and locations of potential proposed colors within a mathematically-defined color space.

Additionally, the golden ratio module 162 may generate a second golden triangle 400 within the mathematically-defined color space. For example, FIG. 4 depicts the location target color 310 and locations of potential proposed colors 320, 330, 410, and 430 within the mathematically-defined color space 300. In the case of the second golden triangle 400, the golden ratio module 162 utilizes the location of the target color 310 and the location of the third color 330, which was previously derived using the golden triangle ratios, in order to generate a location of a fourth color 410 within the mathematically-defined color space 300. As depicted, the location of the target color 310 comprises a first vertex of the second golden triangle 400, the location of the third color 330 comprises a second vertex of the second golden triangle 400, and a location of a fourth color 410 comprises a third vertex of the second golden triangle 400. Once the locations of the colors 310, 330, 410 have been identified and mapped to colors within the color database, the computer system 100 displays on the user interface an indication of the target color, the third color, and the fourth color.

FIG. 4 further depicts that the golden ratio module 162 is capable of continuing to generate a third golden triangle 420 utilizing the location of the target color 310 and the location of the fourth color 410 to generate a location of a fifth color 430. One will appreciate that the golden ratio module 162 may continue this process of generating new golden triangles utilizing the location of the target color 310 and sequentially generated new color locations (e.g., 330, 410, 430, etc.). The golden ratio module 162 may continue generating new golden ration triangles until the newly generated color locations no longer associate with new colors within the color database but instead are closer to the target color or previously identified potential accompanying colors than to new colors. Additionally or alternatively, the golden ratio module 162 may continue generating new golden ration triangles until the newly generated color locations are no longer visually distinguishable from the target color or previously identified potential accompanying colors than to other colors. As indicated above, the location of the target color 310 may be used in the generation of every golden triangle in order to ensure that the proposed colors maintain a relationship with the user provided target color 110.

Figure 5:
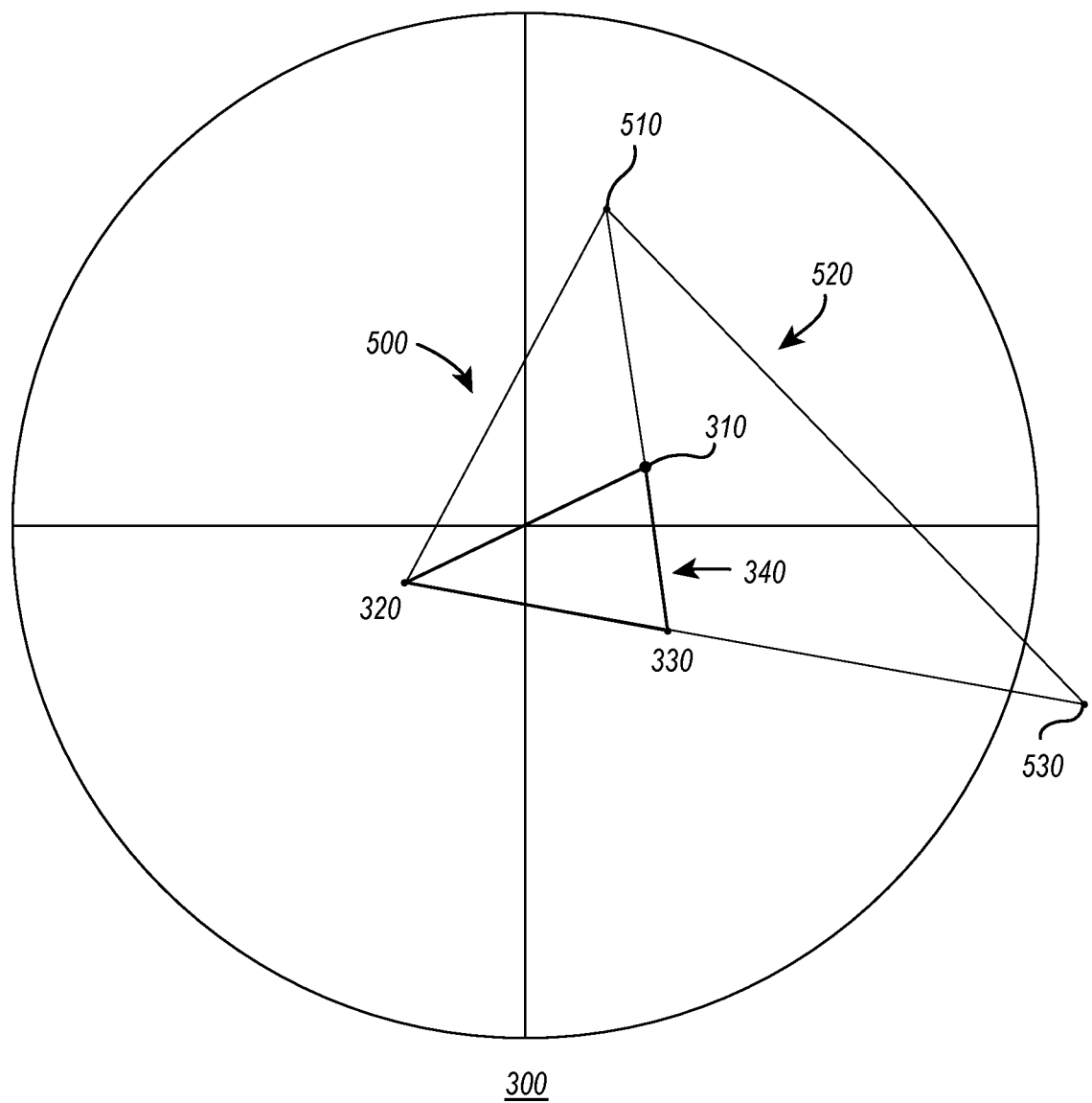
FIG. 5 depicts a location of a target color and locations of potential proposed colors within a mathematically-defined color space.

FIG. 5 depicts a target color 110 and potential proposed colors within a mathematically-defined color space 300. In contrast to FIG. 4, the golden triangles 500, 520 are generated on an outward direction from the first golden triangle 340. Similar to the above described methods, the golden ratio module 162 can identify a new potential accompanying color based upon the location for the sixth color 510. Additionally, the golden ratio module 162 identifies that the location of the seventh color 530 is outside the mathematically-defined color space 300. Accordingly, the golden ratio module 162 determines that the location of the seventh color 530 is not mappable to a color within the color database. The golden ratio module 162 then prevents additional golden triangles from being created.

When generating golden triangles 340, 400, 420 within the mathematically-defined color space 300 (see FIG. 4), the golden ratio module 162 may utilize the concept of the Golden Ratio as a natural way to pattern and proportion aesthetically pleasing combinations of proposed colors. The Golden Ratio, represented by Phi or the Phi Ratio, is an irrational number, $Ø^x \approx 1.618$. The golden ratio module 162 uses the Golden Ratio to suggest computer-generated color palette(s) ("CGCP") associated to a user provided color. As an optional, forced, or potentially recommendation, the algorithms utilize the user's provided color to present computer-generated palettes based on the physical layout (1 dimension through many dimensions) of the mathematically-defined color space 300. The user can select 'more options' as much as needed to cascade through a number of different palette options by changing either the palette selection criteria or the mathematically-defined color space 300.

The golden ratio module 162 may utilize a variety of ways to calculate the selection criteria. Most simplistically, the RGB (or CIELAB) of the customer's selected color can be modified by the golden ratio number, as depicted below in Table 1, which shows computer-generated color palette(s) (e.g., CGCP 1, CGCP 2, CGCP 3, CGCP 4) within respective columns.

TABLE 1

| Customer's selection | CGCP 1 | CGCP 2 | CGCP 3 | CGCP 4 |
|---|---|---|---|---|
| R | R/(Ø$^x$) | R/(Ø$^x$) | R | R |
| G | G/(Ø$^x$) | G | G/(Ø$^x$) | G |
| B | B/(Ø$^x$) | B | B | B/(Ø$^x$) |

Where x is a scalar that can be chosen by the computer based on history (bigger scalar for customers who selected more widely-varied colors) or by customer input like a scale bar (e.g. small color palette=1, big color palette=3) and Ø represents the golden ratio of $$\frac{1+\sqrt{5}}{2} = 1.6180339887$$

Figure 6:
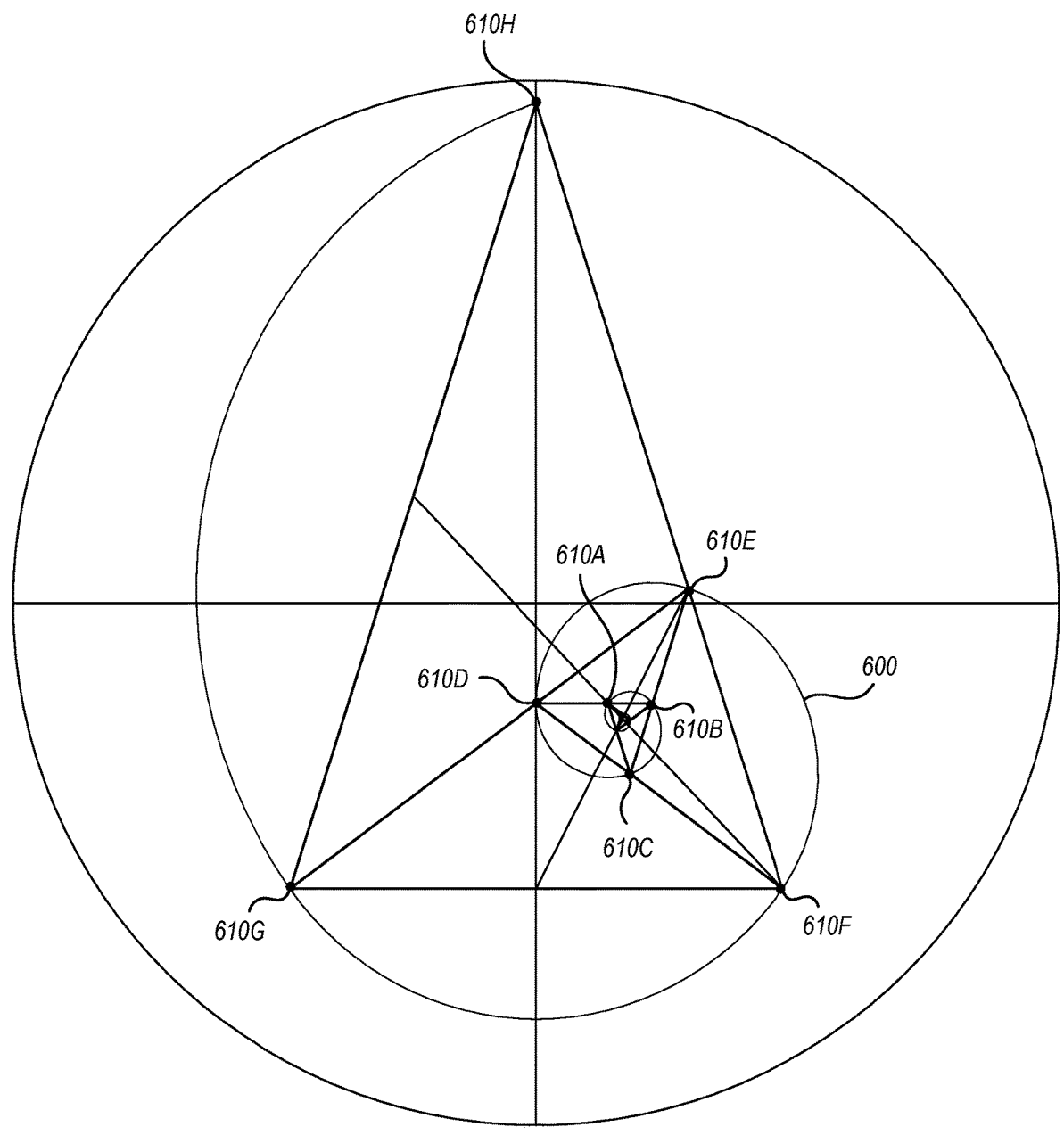
FIG. 6 depicts a golden logarithmic spiral intersecting with locations of proposed colors within a mathematically-defined color space.

The computer system 100 may additionally or alternatively, use a spiral method for selecting additional colors. For example, FIG. 6 depicts a golden logarithmic spiral 600 intersecting with locations of proposed colors 610(a-h) within a mathematically-defined color space 300. By defining the physical position of the layout of the mathematically-defined color space 300, the computer system 100 can select the RGB/CIELAB of the color corresponding to another identified physical position as indicated by the equations below:

$$A = Ø^{x} * D,$$

where D is one dimension of the physical layout (e.g. height).

$$H = \sqrt{\frac{A}{yØ^x}}$$

where H is the computer-identified height dimension.

$$W = \sqrt{A * yØ^x}$$

where W is the computer identified width dimension. Based on the newly calculated H and W, the computer system 100 can identify the color in that position and report it as the computer-generated color palette color. The computer system may also add more colors by varying the scalars, x and y. Also, the computer system can shift the layout of the palette by ±1 (or other scalar) on the height, the width, or any other dimension.

The computer system 100 may additionally or alternatively use lines as a selection criterion. For example, the computer system 100 may select color locations positioned consecutively ±yØ$^x$ away on the mathematically-defined color space 300 in single direction. The computer system 100 may also additionally or alternatively use triangles and tetrahedrons to select colors. The customer-selected color may be supported by another (1, 2, or 3) known harmonic's position in the mathematically-defined color space 300. The golden ratio is used to bisect the hypotenuse at a new point, which is the computer-selected color position. Similar to triangles and tetrahedrons, the computer system 100 can follow pentagons and pentagrams using circles of customer-selected colors, harmonics, or other computer-generated color positions to bisect and relate other physical layout positions in multi-dimensions. In at least the above described configurations, the computer system 100 calculates where the computer-selected color position will not exist in the physical (or digital) layout. Therefore, the calculation is bounded by the degrees of freedom in the original physical layout and may be scaled to it.

Figure 7A:
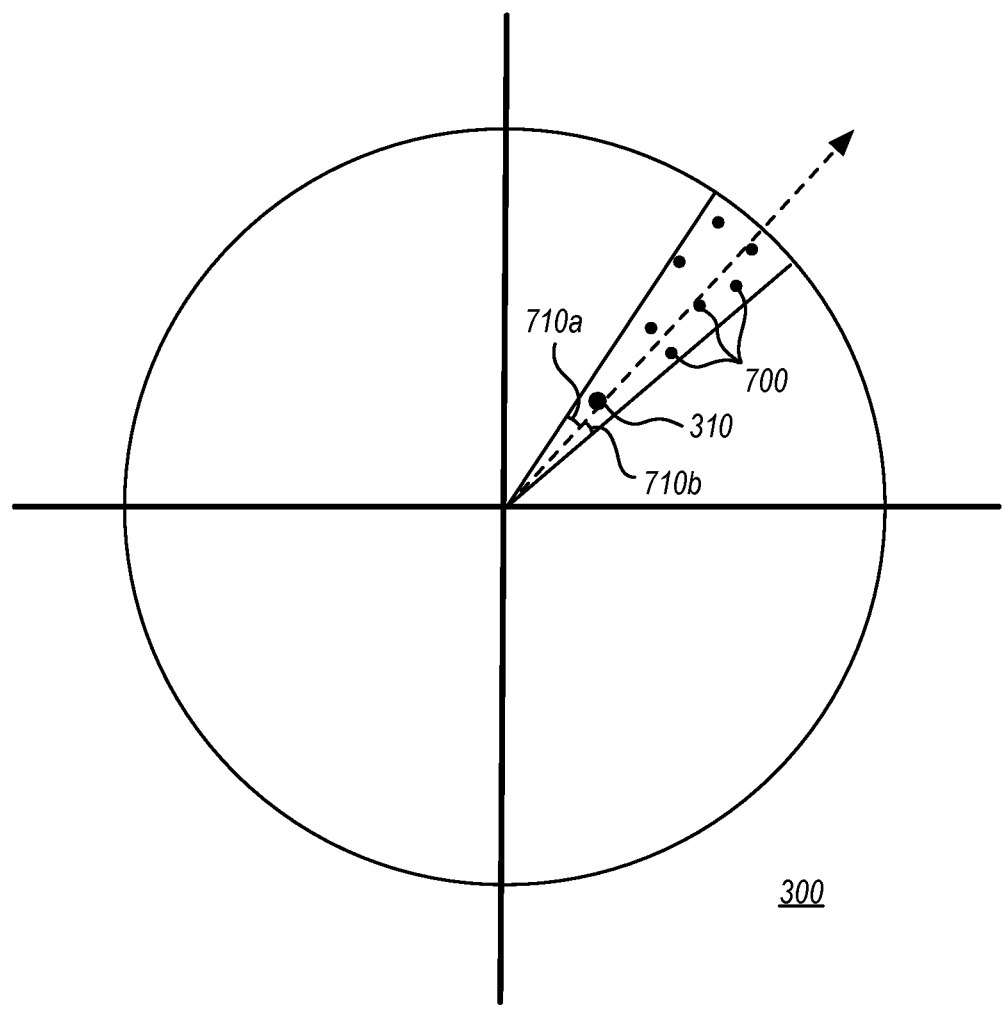
FIG. 7A depicts a location of a target color and locations of potential proposed colors within a mathematically-defined color space.

Turning now to FIG. 7A, FIG. 7A depicts a location of the target color 310 and potential proposed colors within a mathematically-defined color space 300. The monochromatic color module 166 can generate a subset of neighbor colors 700 from the color database of available colors by selecting colors within the color database that are within positive fifteen degrees 710a and negative fifteen degrees 710b of hue variance from location of the target color 310 within the mathematically-defined color space 300. As an example, within the CIELAB color space, hue is measured as an angle within the a*, b* plane. As such, hue variance from the location of the target color 310 may comprise an angular range from the target color 310 within the CIELAB color space. Nevertheless, other values may be used to a similar or different effect depending upon the desired outcome.

The monochromatic color module 166 provides a technical and computational advantage to the computer system 100 by creating a "pie slice" within the mathematically-defined color space 300. By reducing the total possible set of colors to only those that have locations within the "pie slice," the monochromatic color module 166 is capable of much more efficient and fast calculations due to the lower overheard of not requiring a search through the entire mathematically-defined color space 300 and/or the entire color database. Additionally, by creating the subset of neighbor colors 700 within the "pie slice" the monochromatic color module 166 creates a subset of colors that are capable of analysis using simple and efficient distance calculations. In some uses, however, the monochromatic color module 166 is not required to generate the subset of neighbor colors, but instead, operates within the entire mathematically-defined color space 300.

Figure 7B:
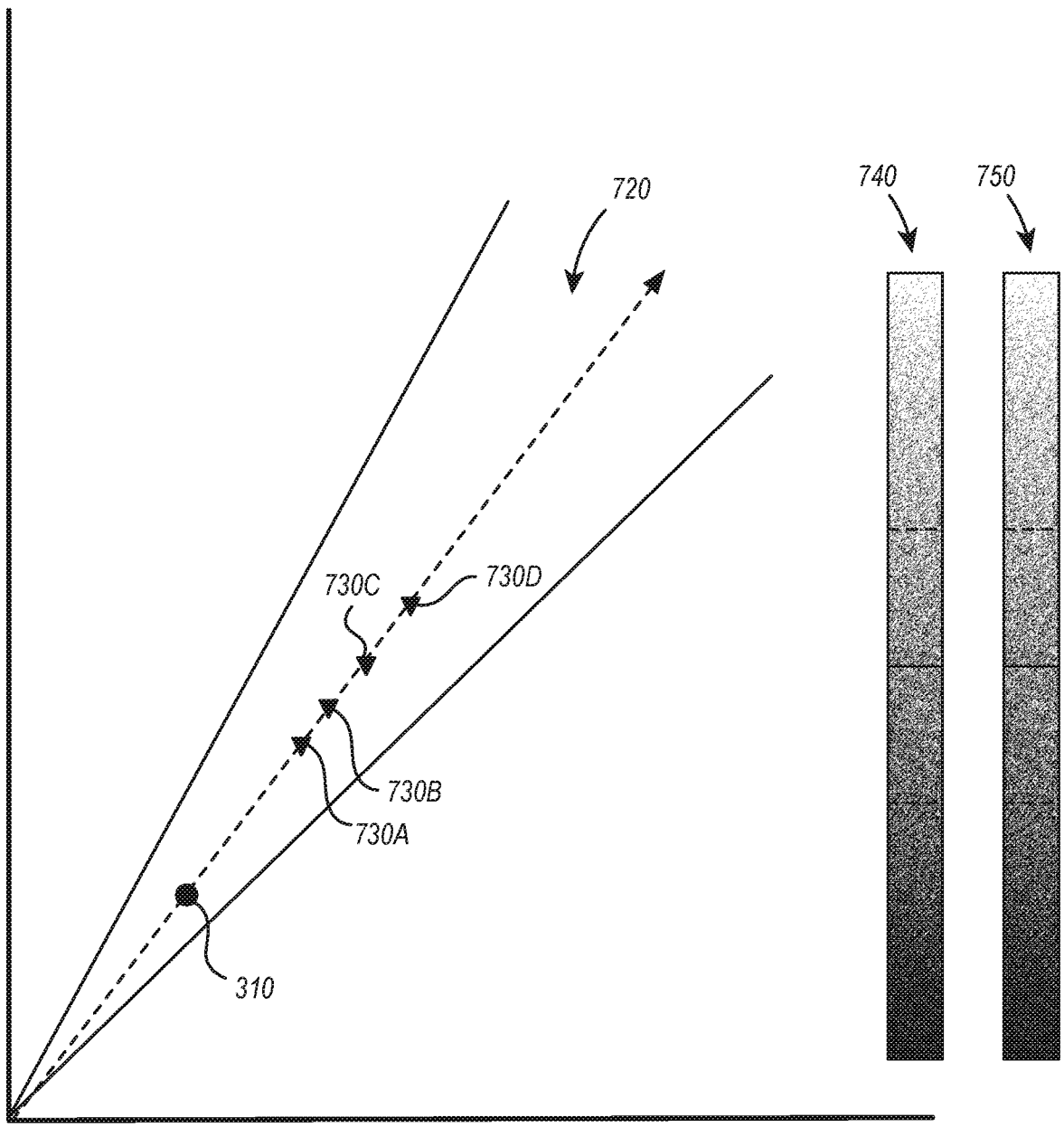
FIG. 7B depicts an expanded portion of the mathematically-defined color space of FIG. 7A.

The monochromatic color module 166 can also identify a subset of hue-similar colors within the subset of neighbor colors. The subset of hue-similar colors comprise colors that are within a particular threshold of hue difference from the target color 110. For example, FIG. 7B depicts an expanded portion of the mathematically-defined color space 300 of FIG. 7A. As depicted, the location of the target color 310 is on a common hue angle with various of colors 730(*a-d*) that fall within the subset of hue-similar colors. The particular threshold of hue difference may comprise colors that are within an absolute value of ten degrees of a hue angle from the target color 110 within the mathematically-defined color space 300, such as the CIELAB color space. Nevertheless, other values may be used to a similar or different effect depending upon the desired outcome. In some uses, however, the monochromatic color module 166 is not required to generate the subset of hue-similar colors from within the subset of neighbor colors, but instead, operates within the entire mathematically-defined color space 300 as it maps to colors available within the color database.

The monochromatic color module 166 can also identify a subset of visually-similar colors within the subset of hue-similar colors. The subset of visually-similar colors comprise colors that are within a particular threshold of delta E from the target color. One of skill in the art will appreciate that delta E (ΔE) comprises a distance metric defined by the International Commission on Illumination (CIE). Delta E can be calculated using various known formulas that vary depending upon the particular mathematically-defined color space 300 that is being utilized. For instance, the 1976 for delta E is expressed as:

$$\Delta E^*_{ab} = \sqrt{(L^*_2-L^*_1)^2+(a^*_2-a^*_1)^2+(b^*_2-b^*_1)^2}$$

where $\Delta E^*_{ab}$ ~2.3 corresponds to a just noticeable difference in color perception. Additionally, one of skill in the art will appreciate that modern equations for ΔE are much more complicated to address non-uniformities within various mathematically-defined color spaces 300. Nevertheless, for the sake of clarity and explanation, the 1976 equation is presented herein.

Using these formulas, the monochromatic color module 166 can identify a subset of visually-similar colors within the subset of hue-similar colors by calculating the ΔE between every color within the subset of hue-similar colors and the target color 110. The monochromatic color module 166 identifies a subset of visually similar colors that are within a threshold ΔE from the target color 110. For example, the threshold ΔE may comprise a value of about 60. Nevertheless, other values may be used to a similar or different effect depending upon the desired outcome. In some uses, however, the monochromatic color module 166 is not required to generate the subset of visually-similar colors from within the subset of hue-similar colors, but instead, operates within the entire mathematically-defined color space 300 as it maps to colors available within the color database.

Returning to FIG. 7B, a chroma scale 740 and a lightness scale 750 are depicted. The depicted chroma scale 740 and a lightness scale 750 are provided only for the sake of clarity and explanation. One of skill in the art will appreciate that these values can be calculated and displayed without using respective scales. However, in order to maintain the clarity of the figures, they are depicted as scales herein.

The monochromatic color module 166 can also identify a first set of proposed colors within the subset of visually-similar colors. The first set of proposed colors comprise colors that are both within a first negative threshold of chroma difference from the target color and within a first positive threshold of lightness difference from the target color. For example, if implemented within a CIELAB color space using the chroma difference (C*), the first negative threshold of chroma difference may comprise a range of 0 to −10 and the first positive threshold of lightness difference may comprise a range of 10-20. It is believed that these particular thresholds provide desirable proposed colors due to the specific ranges of both the chroma and the lightness when compared to the target color 110. Nevertheless, other ranges may be used to a similar or different effect depending upon the desired outcome. The computer system 100 can then display on the user interface 200 the first set of proposed colors as potential accompanying colors to the target color.

Additionally, the monochromatic color module 166 can identify a second set of proposed colors within the subset of visually-similar colors. The second set of proposed colors comprises colors that are both within a first positive threshold of chroma difference from the target color and within a first negative threshold of lightness difference from the target color. For example, the first positive threshold of chroma difference may comprise a range of 0 to 10 and the first negative threshold of lightness difference may comprise a range of −10 to −20. It is believed that these particular thresholds provide desirable proposed colors due to the specific ranges of both the chroma and the lightness when compared to the target color 110. Nevertheless, other ranges may be used to a similar or different effect depending upon the desired outcome. The computer system 100 can then display on the user interface 200 the second set of proposed colors as potential accompanying colors to the target color.

Further, the monochromatic color module 166 can identify a third set of proposed colors within the subset of visually-similar colors. The third set of proposed colors comprise colors that are both within a second negative threshold of chroma difference from the target color and within a second positive threshold of lightness difference from the target color. In some cases, an absolute value of the second negative threshold of chroma difference is greater than the first negative threshold of chroma difference, and an absolute value of the second positive threshold of lightness difference is greater than the first positive threshold of lightness difference. For example, the second negative threshold of chroma difference may comprise a range of 0 to −20 and the second positive threshold of lightness difference may comprise a range of 30 to 40. It is believed that these particular thresholds provide desirable proposed colors due to the specific ranges of both the chroma and the lightness when compared to the target color 110. Nevertheless, other ranges may be used to a similar or different effect depending upon the desired outcome. The computer system 100 can then display on the user interface 200 the third set of proposed colors as potential accompanying colors to the target color.

Further still, the monochromatic color module 166 can identify a fourth set of proposed colors within the subset of visually-similar colors. The fourth set of proposed colors comprise colors that are both within a second positive threshold of chroma difference from the target color and within a second negative threshold of lightness difference from the target color. In some cases, an absolute value of the second positive threshold of chroma difference is greater than the first positive threshold of chroma difference, and an absolute value of the second negative threshold of chroma difference is greater than the first positive threshold of lightness difference. For example, the second positive threshold of chroma difference may comprise a range of 0 to 20 and the second negative threshold of lightness difference may comprise a range of −30 to −40. It is believed that these particular thresholds provide desirable proposed colors due to the specific ranges of both the chroma and the lightness when compared to the target color 110. Nevertheless, other ranges may be used to a similar or different effect depending upon the desired outcome. The computer system 100 can then display on the user interface 200 the fourth set of proposed colors as potential accompanying colors to the target color.

While the above described examples utilize the monochromatic color module 166 to identify particular ranges of chroma and lightness shifts to generate sets of proposed colors, other ranges may also be used to similar effect. For example, Table 2 describes ten different examples of combinations of chroma and lightness ranges that can be utilized to identify proposed colors from within the subset of visually-similar colors.

TABLE 2

| Proposed Color | Chroma | Lightness |
| --- | --- | --- |
| Proposed Color 1 | <= −50 AND >= −70 | <= 90 AND >= 70 |
| Proposed Color 2 | <= −30 AND >= −50 | <= 70 AND >= 50 |
| Proposed Color 3 | <= −10 AND >= −30 | <= 50 AND >= 30 |
| Proposed Color 4 | <= 0 AND >= −20 | <= 30 AND >= 10 |
| Proposed Color 5 | <= 10 AND >= −10 | <= 10 AND >= −10 |
| Proposed Color 6 | <= 30 AND >= 10 | <= −10 AND >= −30 |
| Proposed Color 7 | <= 40 AND >= 20 | <= −30 AND >= −50 |
| Proposed Color 8 | <= 50 AND >= 30 | <= −50 AND >= −70 |
| Proposed Color 9 | <= 70 AND >= 50 | <= −70 AND >= −90 |
| Proposed Color 10 | <= 90 AND >= 70 | <= −90 AND >= −110 |

Figure 8:
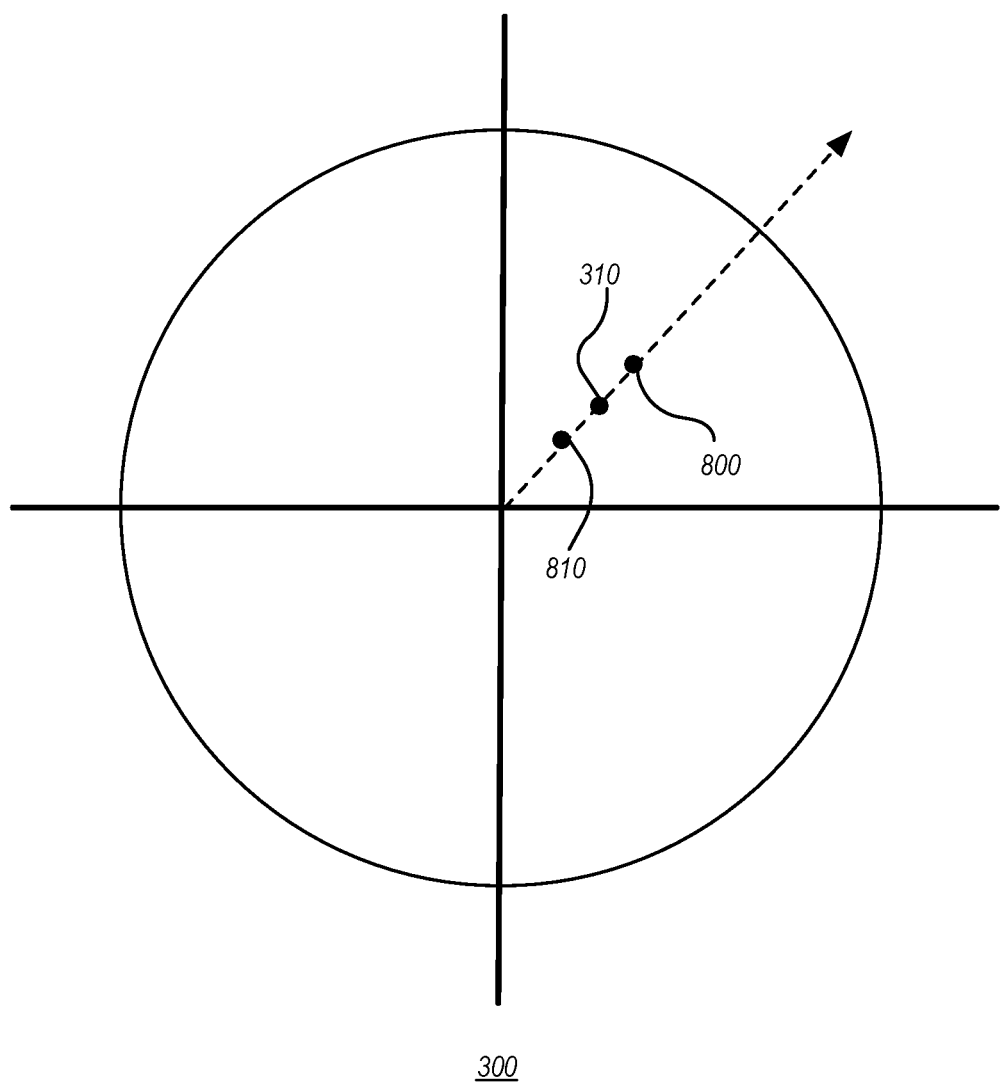
FIG. 8 depicts a location of a target color and locations of potential proposed colors within a mathematically-defined color space.

FIG. 8 depicts a location of a target color 310 and locations of potential proposed colors 800, 810 within a mathematically-defined color space 300. As depicted in FIG. 1, the neighbor color module 168 can identify a location of a first proposed neighbor color 800 within the mathematically-defined color space 300. The location of the first proposed neighbor color 800 is a positive threshold shift in chroma value from the location of the target color 310 within the mathematically-defined color space 300. The neighbor color module 168 identifies the first proposed neighbor color within the color database that is nearest to the location of a first proposed neighbor color 800. The positive threshold may comprise a chroma value of 15. The neighbor color module 168 also identifies a location of a second proposed neighbor color 810 within the mathematically-defined color space 300. The location of the second proposed neighbor color 810 is a negative threshold shift in chroma value from the location of the target color 310 within the mathematically-defined color space 300. The negative threshold may comprise a chroma value of −15. The neighbor color module 168 identifies the second proposed neighbor color within the color database that is nearest to the location of a second proposed neighbor color 810. The computer system 100 then displays, on the user interface, the first proposed neighbor color and the second proposed neighbor color.

Accordingly, the methods, systems and computer-readable media disclosed herein provide several examples of technical improvements in the area of computer-generated color palette(s). Modern color databases are enormous and complex. Computers lack the intuitive ability to identify colors that are aesthetically pleasing when grouped together. Embodiments disclosed herein provide improved methods for efficiently generating computer-generated color palette (s).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
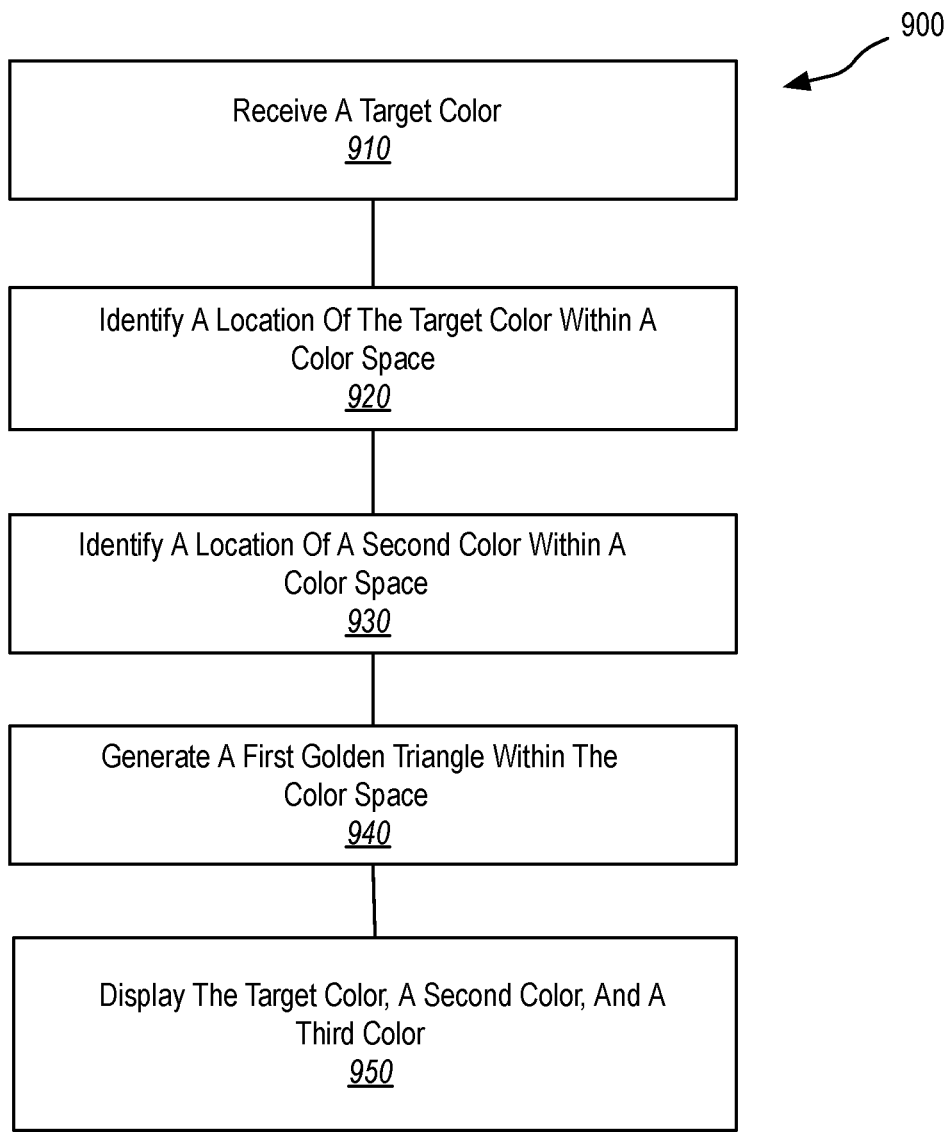
FIG. 9 depicts a flowchart of steps in a method for the dynamic generation of custom color selections.

FIG. 9 depicts a flowchart of steps in a method 900 for the dynamic generation of custom color selections. Method 900 includes an act 910 of receiving a target color. Act 910 comprises receiving from a user an indication of a target color. For example, as depicted and described with respect to FIG. 1, a user provides an indication of a target color 110 to a computer system 100. The computer system 100 then maps that indication of the target color 110 to an actual target color 110 that is present within a color database.

Additionally, method 900 includes an act 920 of identifying a location of the target color within a color space. Act 920 comprises identifying a location of the target color 310 within a mathematically-defined color space 300. For example, as depicted and described with respect to FIGS. 3-8, several different mathematically-defined color spaces 300 have been created and are conventionally known within the art. The computer system 100 is configured to identify a location of the target color 310 within a mathematically-defined color space 300 of the target color 110 that was identified within the color database. In some cases, the location of the target color 310 may be provided by information within the color database, whereas in other cases, the computer system 100 calculates the location.

Method 900 also includes an act 930 of identifying a location of a second color within a color space. Act 930 comprises identifying a location of a second color 320 within the mathematically-defined color space 300. For example, as depicted and described with respect to FIG. 3, the opposite color module 164 can calculate an inverse of the coordinates of the location of the target color 310. The resulting "opposite location" may comprise the location of the second color 320.

In addition, method 900 includes an act 940 of generating a first golden triangle within the color space. Act 940 comprises generating a first golden triangle within the mathematically-defined color space, wherein the location of the target color comprises a first vertex of the first golden triangle, the location of the second color comprises a second vertex of the first golden triangle, and a location of a third color comprises a third vertex of the first golden triangle. For example, as depicted and described with respect to FIGS. 3-5, the golden ratio module 162 identifies a location of a third color 320 using the golden ratio. Using the location of a third color 320, the golden ratio module 162 is able to create a golden triangle within the mathematically-defined color space 300.

Further, method 900 includes an act 950 of displaying the target color, a second color and a third color. Act 950 comprises displaying on a user interface 200 an indication of the target color 110, the second color, and the third color. For example, as depicted and described with respect to FIG. 2, the user interface 200 displays various different categories 220(a-c) of accompanying colors 210, which can include the second color and the third color.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Additionally, the stated numerical values and ranges are not meant to be exhaustive, but instead meant to indicate examples of potential ranges and limits to color values.

Whereas particular examples of this invention have been described above for purposes of illustration, it will be evident to those skilled in the art that numerous variations of the details of the present invention may be made without departing from the invention as defined in the appended claims.

The present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The invention is further specified in the following clauses:

Clause 1: A computer system for dynamic generation of custom color selections, comprising:
one or more processors; and
one or more computer-readable media having stored thereon executable instructions that when executed by the one or more processors configure the computer system to perform, particularly a method according to any of clauses 17 to 25, at least the following:
receive from a user an indication of a target color;
identify a location of the target color within a mathematically-defined color space;
identify a location of a second color within the mathematically-defined color space;
generate a first golden triangle within the mathematically-defined color space, wherein:
the location of the target color comprises a first vertex of the first golden triangle,
the location of the second color comprises a second vertex of the first golden triangle, and
a location of a third color comprises a third vertex of the first golden triangle; and
display on a user interface an indication of the target color and the third color.

Clause 2: The computer system of clause 1, wherein receiving from a user an indication of a target color comprises the provision of a picture or sample of an object.

Clause 3: The computer system of clause 2, wherein receiving from a user an indication of a target color comprises measuring the color of the picture or sample of an object using a spectrometer, wherein the measured color is the indication of a target color.

Clause 4: The computer system of any of clauses 1 to 3, wherein the executable instructions include instructions that are executable to configure the computer system to:
generate a second golden triangle within the mathematically-defined color space, wherein:
the location of the target color comprises a first vertex of the second golden triangle,
the location of the third color comprises a second vertex of the second golden triangle, and
a location of a fourth color comprises a third vertex of the second golden triangle; and
display on the user interface an indication of the target color, the third color, and the fourth color.

Clause 5. The computer system of clause 4, wherein the third color comprises a specific color selected from a color database that is located closest to the location of the third color within the mathematically-defined color space, and/or wherein the fourth color comprises a specific color selected from a color database that is located closest to the location of the fourth color within the mathematically-defined color space Clause 6: The computer system of any of clauses 1 to 5, wherein identifying the location of the second color within the mathematically-defined color space comprises calculating a set of second-color coordinates that are inverse to a set of coordinates associated with the target color, particularly inverse the a* and b* coordinates in a CIELAB color space.

Clause 7: The computer system of any of clauses 1 to 6, wherein the executable instructions include instructions that are executable to configure the computer system to display the second color on the user interface.

Clause 8: The computer system of any of clauses 1 to 7, wherein the second color comprises a specific color selected from a color database that is located closest to the location of the second color within the mathematically-defined color space.

Clause 9: The computer system of any of clauses 1 to 8, wherein the third color comprises a specific color selected from a color database that is located closest to the location of the third color within the mathematically-defined color space.

Clause 10: The computer system of any of clauses 1 to 9, wherein receiving from the user the indication of the target color comprises:
receiving a particular color; and
identifying, within a color database, a nearest matching color to the particular color, wherein identify a location of the target color within a mathematically-defined color space comprises
identifying a nearest matching color, within a color database, to the indication of a target color, wherein the nearest matching color is the location of the target color.

Clause 11: The computer system of any of clauses 1 to 10, wherein the executable instructions include instructions that are executable to configure the computer system to:
generate a subset of neighbor colors from the color database of available colors by selecting colors within the color database that are within positive or negative fifteen degrees of hue variance to the target color within the mathematically-defined color space, wherein the target color is located at an a* and b* coordinate pair within the CIELAB color space.

Clause 12: The computer system of any of clauses 1 to 11, wherein the executable instructions include instructions that are executable to configure the computer system to:
identify a subset of hue-similar colors within the subset of neighbor colors, wherein the subset of hue-similar colors comprise colors that are within a particular threshold of hue difference, such as 10 degrees, from the target color;

identify a subset of visually-similar colors within the subset of hue-similar colors, wherein the subset of visually-similar colors comprise colors that are within a particular threshold of delta E, such as below 60 or 30 or 20 or 10 or 5, from the target color;

identify a first set of proposed colors within the subset of visually-similar colors, wherein the first set of proposed colors comprise colors that are both within a first negative threshold of chroma difference, such as 0 to −10, from the target color and within a first positive threshold of lightness difference, such as 10 to 20, from the target color;

identify a second set of proposed colors within the subset of visually-similar colors, wherein the second set of proposed colors comprise colors that are both within a first positive threshold of chroma difference, such as 0 to 10, from the target color and within a first negative threshold of lightness difference, such as −10 to −20, from the target color; and display the first set of proposed colors and the second set of proposed colors on the user interface.

Clause 13: The computer system of any of clauses 1 to 12, wherein the mathematically-defined color space is the CIELAB color space, wherein L* is the lightness, a* is the red/green value and b* is the blue/yellow value, and/or the RGB color space.

Clause 14: The computer system of any of clauses 1 to 13, wherein identification of a location of the respective colors, particularly target, second and third colors, within a mathematically-defined color space is done in CIELAB color space, wherein the coordinates of the locations comprise the a* and b* values in CIELAB color space.

Clause 15: The computer system of any of clauses 1 to 14, wherein the executable instructions include instructions that are executable to configure the computer system to:

identify a third set of proposed colors within the subset of visually-similar colors, wherein the third set of proposed colors comprise colors that are both within a second negative threshold of chroma difference, such as of 0 to −20, from the target color and within a second positive threshold of lightness difference, such as 30 to 40, from the target color, wherein:
　an absolute value of the second negative threshold of chroma difference is greater than the first negative threshold of chroma difference, and
　an absolute value of the second positive threshold of lightness difference is greater than the first positive threshold of lightness difference;

identify a fourth set of proposed colors within the subset of visually-similar colors, wherein the fourth set of proposed colors comprises colors that are both within a second positive threshold of chroma difference, such as of 0 to 20, from the target color and within a second negative threshold of lightness difference, such as of −30 to −40, from the target color, wherein:
　an absolute value of the second positive threshold of chroma difference is greater than the first positive threshold of chroma difference, and
　an absolute value of the second negative threshold of chroma difference is greater than the first positive threshold of lightness difference; and display the third set of proposed colors and the fourth set of proposed colors on the user interface.

Clause 16: The computer system of any of clauses 1 to 15, wherein the executable instructions include instructions that are executable to configure the computer system to:

identify a location of a first proposed neighbor color within the mathematically-defined color space, wherein the location of the first proposed neighbor color is a positive threshold shift in chroma value, such as 15, from the location of the target color within the mathematically-defined color space;

identify the first proposed neighbor color within the color database that is nearest to the location of a first proposed neighbor color;

identify a location of a second proposed neighbor color within the mathematically-defined color space, wherein the location of the second proposed neighbor color is a negative threshold shift in chroma value, such as 15, from the location of the target color within the mathematically-defined color space;

identify the second proposed neighbor color within the color database that is nearest to the location of a second proposed neighbor color; and display, on the user interface, the first proposed neighbor color and the second proposed neighbor color.

Clause 17: A method, executed on one or more processors, for dynamic generation of custom color selections, particularly as defined in any of clauses 1 to 16 for a computer system, comprising:

receiving from a user an indication of a target color;

identifying a location of the target color within a mathematically-defined color space;

identifying a location of a second color within the mathematically-defined color space;

generating a first golden triangle within the mathematically-defined color space, wherein:
　the location of the target color comprises a first vertex of the first golden triangle,
　the location of the second color comprises a second vertex of the first golden triangle, and
　a location of a third color comprises a third vertex of the first golden triangle; and displaying on a user interface an indication of the target color, the second color, and the third color.

Clause 18: The method of clause 17, further comprising:

generating a second golden triangle within the mathematically-defined color space, wherein:
　the location of the target color comprises a first vertex of the second golden triangle,
　the location of the third color comprises a second vertex of the second golden triangle, and
　a location of a fourth color comprises a third vertex of the second golden triangle; and displaying on the user interface an indication of the target color, the third color, and the fourth color.

Clause 19: The method of clauses 17 or 18, wherein identifying the location of the second color within the mathematically-defined color space comprises calculating a set of second-color coordinates that are inverse to a set of coordinates associated with the target color.

Clause 20: The method of any of clauses 17 to 19, further comprising configuring a computer system to display the second color on the user interface.

Clause 21: The method of any of clauses 17 to 20, wherein the third color comprises a specific color selected from a color database that is located closest to the location of the third color within the mathematically-defined color space.

Clause 22: The method of clause 21, wherein receiving from the user the indication of the target color comprises:

receiving a particular color; and identifying, within a color database, a nearest matching color to the particular color, wherein identify a location of the target color within a mathematically-defined color space comprises identifying a nearest matching color, within a color database, to indication of a target color, wherein the nearest matching color is the target color.

Clause 23: The method of any of clauses 17 to 22, further comprising generating a subset of neighbor colors from the color database of available colors by selecting colors within the color database that are within positive or negative fifteen degrees of hue variance to the target color within the mathematically-defined color space.

Clause 24: The method of any of clauses 17 to 23, further comprising:

identifying a subset of hue-similar colors within the subset of neighbor colors, wherein the subset of hue-similar colors comprise colors that are within a particular threshold of hue difference, such as 10 degrees, from the target color;

identifying a subset of visually-similar colors within the subset of hue-similar colors, wherein the subset of visually-similar colors comprise colors that are within a particular threshold of delta E, such as below 60 or 30 or 20 or 10 or 5, from the target color;

identifying a first set of proposed colors within the subset of visually-similar colors, wherein the first set of proposed colors comprises colors that are both within a first negative threshold of chroma difference, such as 0 to −10, from the target color and within a first positive threshold of lightness difference, such as 10 to 20, from the target color;

identifying a second set of proposed colors within the subset of visually-similar colors, wherein the second set of proposed colors comprises colors that are both within a first positive threshold of chroma difference, such as 0 to 10, from the target color and within a first negative threshold of lightness difference, such as −10 to −20, from the target color; and displaying the first set of proposed colors and the second set of proposed colors on the user interface.

Clause 25: The method of any of clauses 17 to 24, further comprising:

identifying a subset of hue-similar colors within the subset of neighbor colors, wherein the subset of hue-similar colors comprise colors that are within a particular threshold of hue difference, such as 10 degrees, from the target color;

identifying a subset of visually-similar colors within the subset of hue-similar colors, wherein the subset of visually-similar colors comprise colors that are within a particular threshold of delta E, such as below 60 or 30 or 20 or 10 or 5, from the target color;

identifying a third set of proposed colors within the subset of visually-similar colors, wherein the third set of proposed colors comprises colors that are both within a second negative threshold of chroma difference, such as of 0 to −20, from the target color and within a second positive threshold of lightness difference, such as 30 to 40, from the target color, wherein:
an absolute value of the second negative threshold of chroma difference is greater than the first negative threshold of chroma difference, and
an absolute value of the second positive threshold of lightness difference is greater than the first positive threshold of lightness difference;

identifying a fourth set of proposed colors within the subset of visually-similar colors, wherein the fourth set of proposed colors comprises colors that are both within a second positive threshold of chroma difference, such as of 0 to 20, from the target color and within a second negative threshold of lightness difference, such as of −30 to −40, from the target color, wherein:
an absolute value of the second positive threshold of chroma difference is greater than the first positive threshold of chroma difference, and
an absolute value of the second negative threshold of chroma difference is greater than the first positive threshold of lightness difference; and displaying the third set of proposed colors and the fourth set of proposed colors on the user interface.

Clause 26: A computer-readable media comprising one or more physical computer-readable storage media having stored thereon computer-executable instructions, particularly as defined in any of clauses 1 to 16, that, when executed at a processor, cause a computer system to perform a method for dynamic generation of custom color selections, the method, particularly the method as defined in any of clauses 17 to 25 for the system clauses, comprising:

receiving from a user an indication of a target color;

identifying a location of the target color within a mathematically-defined color space;

identifying a location of a second color within the mathematically-defined color space;

generating a first golden triangle within the mathematically-defined color space, wherein:
the location of the target color comprises a first vertex of the first golden triangle,
the location of the second color comprises a second vertex of the first golden triangle, and
a location of a third color comprises a third vertex of the first golden triangle; and displaying on a user interface an indication of the target color, the second color, and the third color.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention is:

1. A computer system for dynamic generation of custom color selections, comprising:
one or more processors; and
one or more computer-readable media having stored thereon executable instructions that when executed by the one or more processors configure the computer system to:
receive from a user an indication of a target color;
identify a location of the target color within a mathematically-defined color space;
generate a first golden triangle within the mathematically-defined color space, wherein generating the first golden triangle comprises:
identifying the location of the target color as a first vertex of the first golden triangle,
calculating a second vertex of the first golden triangle from the first vertex by calculating a set of second-color coordinates that are inverse to a set of coordinates associated with the first vertex, wherein the second vertex is associated with a second color within the mathematically-defined color space, the second color being inverse to the target color, and
calculate a location of a third color as a third vertex of the first golden triangle; and
display on a user interface an indication of the target color and the third color of the first golden triangle.

2. The computer system of claim 1, wherein the executable instructions include instructions that are executable to configure the computer system to:
generate a second golden triangle within the mathematically-defined color space, wherein:
the location of the target color comprises a first vertex of the second golden triangle,
the location of the third color comprises a second vertex of the second golden triangle, and
a location of a fourth color comprises a third vertex of the second golden triangle; and
display on the user interface an indication of the target color, the third color, and the fourth color.

3. The computer system of claim 1, wherein the executable instructions include instructions that are executable to configure the computer system to display the second color of the first golden triangle on the user interface.

4. The computer system of claim 1, wherein the third color of the first golden triangle comprises a specific color selected from a color database that is located closest to the location of the third color of the first golden triangle within the mathematically-defined color space.

5. The computer system of claim 1, wherein receiving from the user the indication of the target color comprises:
receiving a particular color; and
identifying, within a color database, a nearest matching color to the particular color, wherein the target color comprises the nearest matching color.

6. The computer system of claim 5, wherein the executable instructions include instructions that are executable to configure the computer system to:
generate a subset of neighbor colors from the color database of available colors by selecting colors within the color database that are within positive or negative fifteen degrees of hue variance to the target color within the mathematically-defined color space.

7. The computer system of claim 6, wherein the executable instructions include instructions that are executable to configure the computer system to:
identify a subset of hue-similar colors within the subset of neighbor colors, wherein the subset of hue-similar colors comprise colors that are within a particular threshold of hue difference from the target color;
identify a subset of visually-similar colors within the subset of hue-similar colors, wherein the subset of visually-similar colors comprise colors that are within a particular threshold of delta E from the target color;
identify a first set of proposed colors within the subset of visually-similar colors, wherein the first set of proposed colors comprise colors that are both within a first negative threshold of chroma difference from the target color and within a first positive threshold of lightness difference from the target color;
identify a second set of proposed colors within the subset of visually-similar colors, wherein the second set of proposed colors comprise colors that are both within a first positive threshold of chroma difference from the target color and within a first negative threshold of lightness difference from the target color; and
display the first set of proposed colors and the second set of proposed colors on the user interface.

8. The computer system of claim 7, wherein the executable instructions include instructions that are executable to configure the computer system to:
identify a third set of proposed colors within the subset of visually-similar colors, wherein the third set of proposed colors comprise colors that are both within a second negative threshold of chroma difference from the target color and within a second positive threshold of lightness difference from the target color, wherein:
an absolute value of the second negative threshold of chroma difference is greater than the first negative threshold of chroma difference, and
an absolute value of the second positive threshold of lightness difference is greater than the first positive threshold of lightness difference;
identify a fourth set of proposed colors within the subset of visually-similar colors, wherein the fourth set of proposed colors comprises colors that are both within a second positive threshold of chroma difference from the target color and within a second negative threshold of lightness difference from the target color, wherein:
an absolute value of the second positive threshold of chroma difference is greater than the first positive threshold of chroma difference, and
an absolute value of the second negative threshold of chroma difference is greater than the first positive threshold of lightness difference; and
display the third set of proposed colors and the fourth set of proposed colors on the user interface.

9. The computer system of claim 5, wherein the executable instructions include instructions that are executable to configure the computer system to:
identify a location of a first proposed neighbor color within the mathematically-defined color space, wherein the location of the first proposed neighbor color is a positive threshold shift in chroma value from the location of the target color within the mathematically-defined color space;
identify the first proposed neighbor color within the color database that is nearest to the location of a first proposed neighbor color;
identify a location of a second proposed neighbor color within the mathematically-defined color space, wherein the location of the second proposed neighbor color is a negative threshold shift in chroma value from the location of the target color within the mathematically-defined color space;
identify the second proposed neighbor color within the color database that is nearest to the location of a second proposed neighbor color; and
display, on the user interface, the first proposed neighbor color and the second proposed neighbor color.

10. A method, executed on one or more processors, for dynamic generation of custom color selections, comprising:
receiving from a user an indication of a target color;
identifying a location of the target color within a mathematically-defined color space;
generating a first golden triangle within the mathematically-defined color space, wherein generating the first golden triangle comprises:
identifying the location of the target color as a first vertex of the first golden triangle,
calculating a second vertex of the first golden triangle from the first vertex by calculating a set of second-color coordinates that are inverse to a set of coordinates associated with the first vertex, wherein the second vertex is associated with a second color within the mathematically-defined color space, the second color being inverse to the target color, and
calculate a location of a third color as a third vertex of the first golden triangle;
generating a second golden triangle within the mathematically-defined color space, wherein:
the location of the target color comprises a first vertex of the second golden triangle,
the location of the third color comprises a second vertex of the second golden triangle, and
a location of a fourth color comprises a third vertex of the second golden triangle; and
displaying on a user interface an indication of the target color, the third color, and the fourth color.

11. The method of claim 10, wherein identifying the location of the second color of the first golden triangle within the mathematically-defined color space comprises calculating a set of second-color coordinates that are inverse to a set of coordinates associated with the target color.

12. The method of claim 10, further comprising configuring a computer system to display the second color of the first golden triangle on the user interface.

13. The method of claim 10, wherein the third color of the first golden triangle comprises a specific color selected from a color database that is located closest to the location of the third color of the first golden triangle within the mathematically-defined color space.

14. The method of claim 10, wherein receiving from the user the indication of the target color comprises:
receiving a particular color; and
identifying, within a color database, a nearest matching color to the particular color, wherein the target color comprises the nearest matching color.

15. The method of claim 14, further comprising generating a subset of neighbor colors from the color database of available colors by selecting colors within the color database that are within positive or negative fifteen degrees of hue variance to the target color within the mathematically-defined color space.

16. The method of claim 15, further comprising:
identifying a subset of hue-similar colors within the subset of neighbor colors, wherein the subset of hue-similar colors comprise colors that are within a particular threshold of hue difference from the target color;
identifying a subset of visually-similar colors within the subset of hue-similar colors, wherein the subset of visually-similar colors comprise colors that are within a particular threshold of delta E from the target color;
identifying a first set of proposed colors within the subset of visually-similar colors, wherein the first set of proposed colors comprises colors that are both within a first negative threshold of chroma difference from the target color and within a first positive threshold of lightness difference from the target color;
identifying a second set of proposed colors within the subset of visually-similar colors, wherein the second set of proposed colors comprises colors that are both within a first positive threshold of chroma difference from the target color and within a first negative threshold of lightness difference from the target color; and
displaying the first set of proposed colors and the second set of proposed colors on the user interface.

17. The method of claim 16, further comprising:
identifying a subset of hue-similar colors within the subset of neighbor colors, wherein the subset of hue-similar colors comprise colors that are within a particular threshold of hue difference from the target color;
identifying a subset of visually-similar colors within the subset of hue-similar colors, wherein the subset of visually-similar colors comprise colors that are within a particular threshold of delta E from the target color;
identifying a third set of proposed colors within the subset of visually-similar colors, wherein the third set of proposed colors comprises colors that are both within a second negative threshold of chroma difference from the target color and within a second positive threshold of lightness difference from the target color, wherein:
an absolute value of the second negative threshold of chroma difference is greater than the first negative threshold of chroma difference, and
an absolute value of the second positive threshold of lightness difference is greater than the first positive threshold of lightness difference;
identifying a fourth set of proposed colors within the subset of visually-similar colors, wherein the fourth set of proposed colors comprises colors that are both within a second positive threshold of chroma difference from the target color and within a second negative threshold of lightness difference from the target color, wherein:
an absolute value of the second positive threshold of chroma difference is greater than the first positive threshold of chroma difference, and
an absolute value of the second negative threshold of chroma difference is greater than the first positive threshold of lightness difference; and
displaying the third set of proposed colors and the fourth set of proposed colors on the user interface.

18. A non-transitory computer-readable media comprising one or more physical computer-readable storage media having stored thereon computer-executable instructions that, when executed at a processor, cause a computer system to perform a method for dynamic generation of custom color selections, the method comprising:
receiving from a user an indication of a target color;
identifying a location of the target color within a mathematically-defined color space;
identifying a location of a second color within the mathematically-defined color space;
generating a first golden triangle within the mathematically-defined color space, wherein:
the location of the target color comprises a first vertex of the first golden triangle,
the location of the second color comprises a second vertex of the first golden triangle, and
a location of a third color comprises a third vertex of the first golden triangle;
displaying on a user interface an indication of the target color and the third color of the first golden triangle;
generating a subset of neighbor colors from a color database of available colors by selecting colors within the color database that are within positive or negative fifteen degrees of hue variance to the target color within the mathematically-defined color space;
identifying a subset of hue-similar colors within the subset of neighbor colors, wherein the subset of hue-similar colors comprise colors that are within a particular threshold of hue difference from the target color;
identifying a subset of visually-similar colors within the subset of hue-similar colors, wherein the subset of visually-similar colors comprise colors that are within a particular threshold of delta E from the target color;

identifying a first set of proposed neighbor colors within the subset of visually-similar colors, wherein the first set of proposed neighbor colors comprises colors that are both within a first negative threshold of chroma difference from the target color and within a first positive threshold of lightness difference from the target color;

identifying a second set of proposed neighbor colors within the subset of visually-similar colors, wherein the second set of proposed neighbor colors comprises colors that are both within a first positive threshold of chroma difference from the target color and within a first negative threshold of lightness difference from the target color; and displaying the first set of proposed neighbor colors and the second set of proposed neighbor colors on the user interface.

* * * * *